Patented June 7, 1949

2,472,482

UNITED STATES PATENT OFFICE 2,472,482

PROCESS OF PREPARING SUBSTITUTED PTERINS

Martin E. Hultquist, Bound Brook, and Paul Franklin Dreisbach, Somerville, N. J., assignors to American Cyanamid Company, New York, N. Y., a corporation of Maine No Drawing. Application October 10, 1947, Serial No. 779,204

6 Claims. (Cl. 260—251)

1

The present invention relates to a new method of preparing pteroylglutamic acid and related compounds.

The process of the present invention comprises reacting 2,4,5-triamino-6-hydroxypyrimidine, a 1,1-dihalo-2,3-epoxypropane and a member of the group consisting of para-aminobenzoic acid and amides thereof. The general reaction which is thought to take place may be illustrated by the following equation:

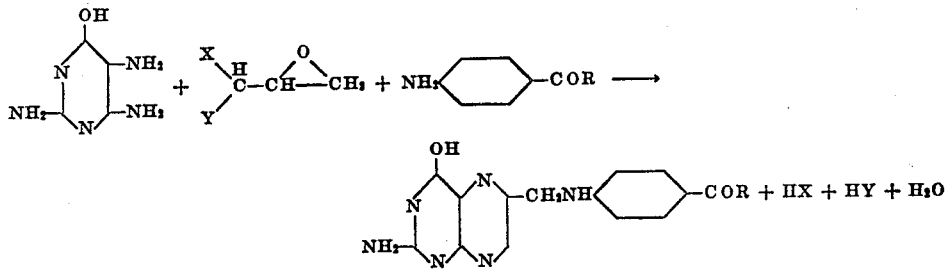

in which X and Y are halogen and R is a member of the group consisting of hydroxyl, amino and substituted amino radicals.

The compound obtained when R is a glutamic acid radical is pteroylglutamic acid or as more generally known, folic acid. The therapeutic properties of this substance have been well described in the literature during the past few years.

The compound 2,4,5-triamino-6-hydroxypyrimidine is known. Although it most probably exists in the form illustrated, it may also exist in whole, or in part, in one or more tautomeric or resonant forms, such as, for example, 2,4,5-triamino-pyrimidone-6. As would be expected, these tautomeric forms react similarly and reference hereinafter to the one tautomer includes the like use of any of the various tautomers. The compound is usually used in the form of one of its acid salts, such as the sulfate or hydrochloride but, if desired, the free base may also be used. In any event, the effective reactant is most probably in ionic form.

The 1,1-dihalo-2,3-epoxypropanes are in general known compounds. The preparation of 1,1-dichloro-2,3-epoxypropane by the treatment of epichlorhydrin with chlorine is described by Cloez, Annales de Chimie et de Physique, 6,9:170 (1886). The halogens represented by X and Y in the general equation can be the same or may be different. We prefer to use this intermediate, a reaction product of the halogenation of an epihalohydrin, without isolation and under these conditions it may be that the epoxide ring is cleaved and the intermediate has the structure of a 1,1-dihalo-2-hydroxy-3-halopropane. It is to be understood that these compounds are included within the scope of the reaction product obtained by the halogenation of an epihalohydrin and reference hereinafter to products resulting from the halogenation of an epihalohydrin shall include 1,1-dihalo-2,3-epoxypropanes as well as 1,1-dihalo-2-hydroxy-3-halopropanes.

The third reactant can be para-aminobenzoic acid, its amide or substituted amides. The amides preferred are those of amino acids in that the final products possess the most useful biological properties when this is so. The preferred amino acid amide is that of glutamic acid although other amino acid amides, such as those of glycine, aspartic acid, leucine, alanine, isovaline, cysteine, and the like with para-aminobenzoic acid may be used. The salts and esters of these amino acid amides may also be used in the process.

The reaction conditions may vary considerably, particularly with respect to the hydrogen ion concentration. The reaction may be carried out at a hydrogen ion concentration of from about pH 1 to about pH 7. Best results are obtained, however, within the range pH 2 to pH 5.

The temperature of the reaction may vary from about 0° C. up to about 100° C.

Water is the preferred solvent for the reaction, although the use of other solvents or diluents is not precluded.

The reactants may be added to each other in various orders. One method which gives good results is to mix the 2,4,5-triamino-6-hydroxypyrimidine with the para-aminobenzoyl derivative, followed by the addition of the halogenated epihalohydrin.

Example I

To a solution of 12.2 parts (0.05 mol.) barium chloride dihydrate in 350 parts water at 60° C. is added 12.9 parts (0.05 mol.) of the sulfate of 2,4,5-triamino-6-hydroxypyrimidine. After stirring at 60° C. for ten minutes the mixture is cooled to 40° C. and 13.3 parts (0.05 mol.) p-aminobenzoylglutamic acid is added. The pH of the solution is immediately adjusted to approximately 3 to 3.5 by the addition of 20% sodium hydroxide solution. There is then added dropwise with stirring over a period of 24 minutes 9.5 parts (equivalent to 0.075 mol.) of the chlorination product obtained by passing chlorine into epichlorhydrin at 70° C. with stirring over a period of 8 hours, dissolved in 15 parts acetic acid. A temperature of 40° C. is maintained throughout this addition and the pH of the solution is kept at 3.5 to 4 by the addition of 20% sodium hydroxide solution. After the addition is complete, the mixture is stirred 15 minutes at 40° C. and then cooled to 15° C. by the addition of ice. After stirring 10 minutes more, filtration and washing of the precipitate with water and alcohol gives 20 parts of brown solid material consisting of the reaction product containing the pteroylglutamic acid. On chemical assay the filtered, washed material contained 2.47% pteroylglutamic acid, yield of 2.4%. Bioassay gave a result of 0.36% pteroylglutamic acid.

*Example II*

A solution of 79.9 parts (0.5 mol.) bromine and 40 parts acetic acid is added dropwise over a total period of 12 hours to a solution of 46.3 parts (0.5 mol.) epichlorohydrin in 100 parts acetic acid. The mixture is stirred throughout the period and the temperature is maintained at 75–80° C. After the addition is complete, the mixture is stirred two hours more at 80° C. and then cooled and diluted with 2 volumes of water yielding two layers. The ether solution obtained by extracting the upper layer three times with diethyl ether and combining with the lower layer is then washed with sodium bicarbonate solution and dried over sodium sulfate. Removal of the ether by distillation leaves a liquid residue which on distillation yielded 54 parts of liquid product with a boiling range of 103°–110° C. at 28–33 mm.

To a solution of 12.2 parts (.05 mol.) barium chloride dihydrate in 350 parts water at 60° C. is added 12.9 parts (.05 mol.) of the sulfate of 2,4,5-triamino-6-hydroxypyrimidine. After stirring at 60° C. for 10 minutes the mixture is cooled to 40° C. and 13.3 parts (.05 mol.) para-aminobenzoyl-glutamic acid is added. The pH of the solution is immediately adjusted to approximately 3 to 3.5 by the addition of 20% sodium hydroxide solution. There is then added in a dropwise fashion with stirring over a 50 minute period, 2 solutions simultaneously, one consisting of 12.8 parts (.075 mol.) of brominated epichlorhydrin prepared above dissolved in 15 parts glacial acetic acid and the other consisting of 12.7 parts iodine and 25.4 parts potassium iodide dissolved in 60 parts water. A temperature of 40° C. is maintained throughout this addition and the pH of the solution is kept at 3 to 3.5 by the further addition of 20% sodium hydroxide solution. After the drop-wise addition of the two solutions is completed, the mixture is stirred for 15 minutes at 40° C. and then cooled to 15° C. by the addition of ice. Filtration and subsequent washing of the precipitate with water and alcohol gives 21.5 parts of brown solid material containing the pteroylglutamic acid. When chemically assayed the product showed 1.82% pteroylglutamic acid.

We claim:

1. A method which comprises reacting together 2,4,5-triamino-6-hydroxypyrimidine, a 1-chloro-1-halo-2,3-epoxypropane and an amino acid amide of para-aminobenzoic acid whereby compounds having the general formula:

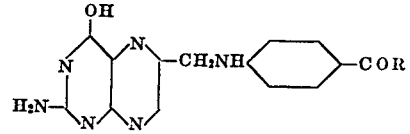

in which R is a radical of the amino acid being attached to the carbonyl group by an amide linkage, are produced and recovered.

2. A method which comprises reacting together 2,4,5-triamino-6-hydroxypyrimidine, a halogenated 1-halo-2,3-epoxypropane and para-aminobenzoyl glutamic acid whereby pteroylglutamic acid is produced and recovered.

3. A method which comprises reacting together 2,4,5-triamino-6-hydroxypyrimidine, a 1-chloro-1-halo-2,3-epoxypropane and para-aminobenzoyl glutamic acid whereby pteroylglutamic acid is produced and recovered.

4. A method which comprises reacting together 2,4,5-triamino-6-hydroxypyrimidine, 1,1-dichloro-2,3-epoxypropane and para-aminobenzoyl glutamic acid, whereby pteroylglutamic acid is produced and recovered.

5. A method which comprises reacting together 2,4,5-triamino-6-hydroxypyrimidine, 1-chloro-1-bromo-2,3-epoxypropane and para-aminobenzoyl glutamic acid whereby pteroylglutamic acid is produced and recovered.

6. A method which comprises reacting together 2,4,5-triamino-6-hydroxypyrimidine, a 1,1-dihalo-2,3-epoxypropane and an amino acid amide of para-amino-benzoic acid whereby compounds having the general formula:

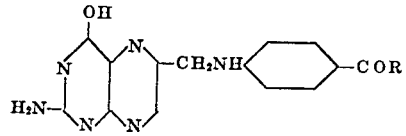

in which R is a radical of the amino acid being attached to the carbonyl group by an amide linkage, are produced and recovered.

MARTIN E. HULTQUIST.
PAUL FRANKLIN DREISBACH.

No references cited.